(12) United States Patent
Sanders et al.

(10) Patent No.: US 9,086,158 B2
(45) Date of Patent: Jul. 21, 2015

(54) SLAM SHUT SAFETY DEVICE HAVING DISC ARRESTOR ASSEMBLY

(71) Applicant: EMERSON PROCESS MANAGEMENT REGULATOR TECHNOLOGIES, INC., McKinney, TX (US)

(72) Inventors: Jeffrey M. Sanders, Dallas, TX (US); Tung K. Nguyen, McKinney, TX (US); Cristian-Tiberiu Moldovan, Cluj-Napoca (RO); Roman Alexandru-Vlad, Cluj-Napoca (RO)

(73) Assignee: EMERSON PROCESS MANGEMENT REGULATOR TECHNOLOGIES INC., McKinney, TX (US)

( * ) Notice: Subject to any disclaimer, the term of this patent is extended or adjusted under 35 U.S.C. 154(b) by 7 days.

(21) Appl. No.: 14/038,453

(22) Filed: Sep. 26, 2013

(65) Prior Publication Data
US 2014/0130884 A1  May 15, 2014

Related U.S. Application Data

(60) Provisional application No. 61/706,429, filed on Sep. 27, 2012.

(51) Int. Cl.
| | |
|---|---|
| F16K 17/04 | (2006.01) |
| F16K 17/00 | (2006.01) |
| F16K 1/36 | (2006.01) |
| F16K 1/48 | (2006.01) |

(52) U.S. Cl.
CPC . *F16K 17/00* (2013.01); *F16K 1/36* (2013.01); *F16K 1/48* (2013.01); *F16K 1/487* (2013.01)

(58) Field of Classification Search
CPC ....... F16K 17/164; F16K 17/10; F16K 17/00; F16K 1/48; F16K 1/487; F16K 1/36
USPC .......... 137/463, 543.21, 543.23, 456, 504.47, 137/12
See application file for complete search history.

(56) References Cited

U.S. PATENT DOCUMENTS

| | | | |
|---|---|---|---|
| 3,818,932 A | * | 6/1974 | Doe et al. ................. 137/494 |
| 4,274,433 A | | 6/1981 | Schnall |
| 6,213,447 B1 | | 4/2001 | Bircann et al. |

(Continued)

OTHER PUBLICATIONS

Search Report for PCT/US2013/061809, mailed Dec. 11, 2013.

(Continued)

*Primary Examiner* — Kevin Lee
*Assistant Examiner* — P. Macade Nichols
(74) *Attorney, Agent, or Firm* — Marshall, Gerstein & Borun LLP

(57) ABSTRACT

A slam-shut safety device having a disc arrestor includes a valve body, a valve seat between an inlet and an outlet, and a reset pin shiftable between untripped and tripped positions. A valve disc support includes a threaded stem and is operatively coupled to the reset pin. A valve disc fits on the stem of the support and shifts in response to movement of the valve disc support between an open position and a closed second position in which the valve disc is seated against the valve seat. A threaded nut is securable to the threaded portion of the stem of the valve disc support, and an arrestor spring is positioned on the stem of the valve disc support and is secured by the threaded nut. The arrestor spring is arranged to apply a biasing force to valve disc.

17 Claims, 7 Drawing Sheets

(56) References Cited

U.S. PATENT DOCUMENTS

2001/0025661 A1  10/2001  Sontag
2003/0094590 A1   5/2003  Palmer
2011/0284102 A1  11/2011  Schneider

OTHER PUBLICATIONS

Written Opinion for PCT/US2013/061809, mailed Dec. 11, 2013.

* cited by examiner

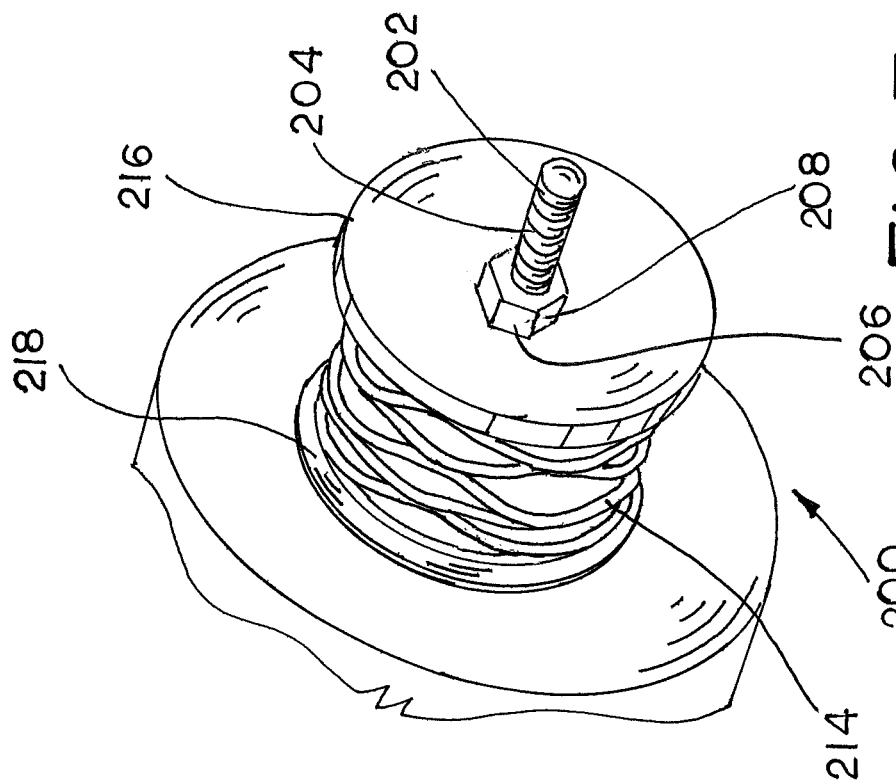
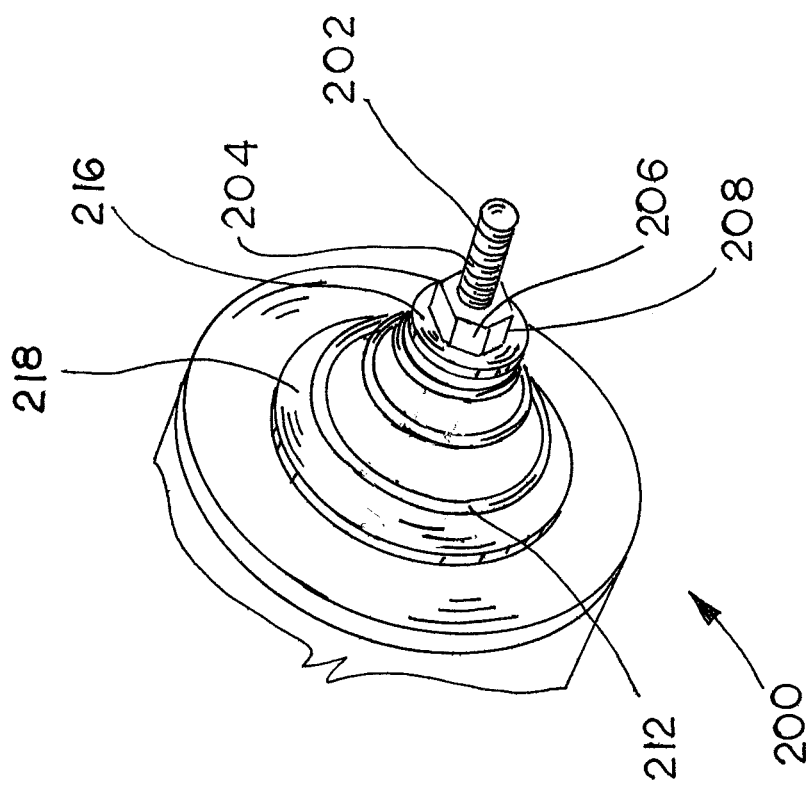

SLAM SHUT SAFETY DEVICE HAVING DISC ARRESTOR ASSEMBLY

FIELD OF THE INVENTION

The present invention relates to slam-shut safety devices for gas distribution systems and, more specifically, relates to a slam-shut safety device incorporating a spring loaded valve disc arrestor.

DESCRIPTION OF THE PRIOR ART

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used as the safety device to shut off flow in appropriate circumstances, such as an over pressure condition or an under pressure condition. For example, U.S. Pat. No. 4,134,421, which is hereby incorporated by reference, discloses a slam-shut safety valve that provides overpressure protection in a pipeline. Another example of a slam-shut safety valve is disclosed in U.S. Pat. No. 8,225,812, which also is incorporated by reference herein. A slam-shut safety valve may be disposed in the system generally upstream of the pressure regulating valve, so that the slam-shut valve may prevent gas from reaching the pressure regulating valve in the event the pressure regulating valve has failed.

Slam-shut safety valves may be positioned to monitor gas pressure adjacent to the pressure regulating valve for maximum and minimum pressure tolerances. As an example, if pressure downstream of the device exceeds either the maximum or minimum tolerance, the slam-shut safety valve closes, cutting off the flow of gas to the pressure regulating valve and preventing an uncontrolled leak of gas due to possible failure of the pressure regulating valve, the pipeline itself in which it is installed, or downstream equipment to which the pressure regulator supplies gas.

Known slam-shut safety valves have a valve disc sized to cover a valve orifice in the vicinity of a valve seat. The valve disc is coupled to a reset pin, and the reset pin in turn is coupled to an actuator that senses the overpressure or underpressure condition. The reset pin is typically in the armed or untripped position, which places the valve disc away from the valve seat in an open position. Should the actuator sense the appropriate trip condition, the actuator releases the reset pin, and the valve disc shifts to the closed position against the valve seat. In conventional slam-shut devices, the valve is typically in an open position during normal operation, and the device is adjusted at a set point. Consequently, the device closes when the pressure in the system varies by a predetermined amount.

When the valve is in the open position, the valve disc is constantly exposed to the flow of fluid through the device. Because the valve disc is mounted on a stem, in certain flow conditions forces acting on the valve disc may pull on the reset pin, which adversely affects the accuracy of the safety device, and which can ultimately cause the device to slam-shut at the wrong set point. These forces also can cause excessive movement of the disc, and in certain circumstances may dislodge the retaining clip that secures the valve disc to the disc support. Further, in certain flow conditions the forces acting on the valve disc can also create bending forces on the reset pin and/or on other components. These bending forces also can contribute to premature wear, and also can adversely affect the accuracy of the slam-shut safety device.

SUMMARY

In accordance with a first exemplary aspect, a slam-shut safety device having a disc arrestor includes a valve body, the valve body having an inlet, an outlet, and defining a flow path extending between the inlet and the outlet, with the valve body including a valve seat surrounding an orifice disposed between the inlet and the outlet. A reset pin is mounted within the valve body and is arranged to respond to an actuator, with the reset pin shiftable relative to the valve body along an axis between an untripped position and a tripped position. A valve disc support includes a stem having a threaded portion, with the valve disc support mounted within the valve body and operatively coupled to the reset pin, and with the valve disc support shiftable relative to the valve body in response to movement of the reset pin between the untripped position and the tripped position. A valve disc includes a central aperture sized to fit on the stem of the valve disc support, with the valve disc shiftably disposed within the valve body and movable in response to movement of the valve disc support between an open first position in which the valve disc is spaced away from the valve seat and a closed second position in which the valve disc is seated against the valve seat. A threaded nut is securable to the threaded portion of the stem of the valve disc support, and an arrestor spring is positioned on the stem of the valve disc support and is secured by the threaded nut. The arrestor spring is arranged to apply a biasing force to valve disc.

In accordance with a second exemplary aspect, a slam-shut safety device having a disc arrestor includes a valve body having an inlet, an outlet, and defining a flow path extending between the inlet and the outlet, with the valve body including a valve seat surrounding an orifice disposed between the inlet and the outlet. A reset pin is mounted within the valve body and is arranged to respond to an actuator, and the reset pin is shiftable relative to the valve body along an axis between an untripped position and a tripped position. A valve disc support is mounted within the valve body and is operatively coupled to the reset pin, with the valve disc support shiftable relative to the valve body in response to movement of the reset pin between the untripped position and the tripped position. A valve disc is shiftably disposed within the valve body and is movable in response to movement of the valve disc support between an open first position in which the valve disc is spaced away from the valve seat and a closed second position in which the valve disc is seated against the valve seat. A valve disc arrestor assembly includes an arrestor spring operatively coupling the valve disc to the valve disc support and an adjustable connection securing the valve disc to the valve disc support, and the arrestor assembly arranged to apply a biasing force to valve disc in a direction parallel to the axis.

In accordance with a third exemplary aspect, a slam-shut safety device includes a valve body having an inlet, an outlet, and defining a flow path extending between the inlet and the outlet, with the valve body including a valve seat surrounding an orifice disposed between the inlet and the outlet. A valve disc is disposed within the valve body and is shiftable along a slam-shut axis between an open first position in which the valve disc is spaced away from the valve seat, and a closed second position in which the valve disc is seated against the valve seat. A reset pin is operatively shiftable along an axis relative to the valve body between an untripped position and a tripped position, with the reset pin arranged to respond to an actuator to shift the reset pin from the untripped position toward the tripped position. A valve disc support is operatively coupled to the reset pin and is shiftable in unison with the reset pin. An arrestor means operatively couples the valve disc to the valve disc support, with the arrestor means arranged to reduce the transfer of fluid forces from the valve disc to the reset pin.

In accordance with a fourth exemplary aspect, a method of arresting movement of a valve disc in a slam-shut safety device includes providing a valve body having an inlet, an outlet, and defining a flow path extending between the inlet and the outlet, the valve body including a valve seat surrounding an orifice disposed between the inlet and the outlet. The method includes providing a valve disc within the valve body that is shiftable along a slam-shut axis between an open first position in which the valve disc is spaced away from the valve seat, and a closed second position in which the valve disc is seated against the valve seat, providing a reset pin that is operatively shiftable along an axis relative to the valve body between an untripped position and a tripped position, and arranging the reset pin to respond to an actuator to shift the reset pin from the untripped position toward the tripped position. The method includes providing a valve disc support operatively coupled to the reset pin and shiftable in unison with the reset pin, and providing an arrestor spring operatively coupling the valve disc to the valve disc support, and arranging the arrestor spring to reduce the transfer of fluid forces from the valve disc to the reset pin.

In further accordance with any one or more of the foregoing first, second, third, or fourth aspects, a slam-shut safety device and/or method may further include any one or more of the following preferred forms.

In one preferred form, the arrestor spring is a steel spring, and the arrestor spring may be a wave spring or a coil spring.

In another preferred form, the valve disc support includes a stem and the arrestor spring is a steel spring positioned to continuously wind around the stem.

In another preferred form, the valve disc support includes a stem and the arrestor spring encircles the stem, and the arrestor spring is a wave spring or a coil spring.

In another preferred form, the valve disc support includes a stem and the arrestor spring is generally cylindrical and surrounds the stem.

In another preferred form, the device includes a washer disposed between the threaded nut and the arrestor spring, and the threaded nut is adjustable along the stem of the valve disc support to allow adjustment of a spring force applied by the arrestor spring to the valve disc.

In another preferred form, the valve body includes a recess sized to receive at least a portion of the valve disc when the valve disc is in the open first position, and the recess is sized to allow placement of the portion of the valve disc out of the flow path.

In another preferred form, the valve disc support is slidably mounted within a guide collar disposed within the valve body. The guide collar may include a hollow cylindrical portion extending at least partly over the reset pin at a location adjacent to the valve disc, with the guide collar slidably supported by a guide bore defined within the valve body. The guide collar may be shiftable along the axis between a retracted position, wherein a majority of the guide collar is disposed inside of the guide bore when the reset pin is in the untripped position, and an extended position, wherein at least a portion of the guide collar is disposed outside of the guide bore when the reset pin is in the tripped position.

In another preferred form, an adjustable connection comprises a threaded nut and a threaded stem carried by the valve disc support, and the threaded nut is adjustable along the stem to allow adjustment of a spring force applied by the arrestor spring to the valve disc. The valve body includes a stop, and the valve disc is arranged to contact the stop when the reset pin is moved to the untripped position. The arrestor spring is arranged to bias the valve disc toward the stop when the valve disc is in the open first position. The valve body may include a recess sized to receive at least a portion of the valve disc when the valve disc is in the open first position, wherein the valve disc engages the stop when the valve disc is disposed in the recess.

A preferred method form includes providing a stop, the valve disc arranged to engage the stop when the valve disc is in the open first position, and arranging the arrestor spring to apply a biasing force to the valve disc against the stop when the valve disc is in the open first position.

Another preferred method form includes providing a recess, and sizing the recess to receive at least a portion of the valve disc when the valve disc is in the open first position.

BRIEF DESCRIPTION OF THE DRAWINGS

FIG. 6 is an enlarged fragmentary view in perspective of the valve disc support and valve disc and showing the valve disc arrestor assembly having a conical spring.

FIG. 7 is an enlarged fragmentary view in perspective of the valve disc support and valve disc and showing the valve disc arrestor assembly having a wave spring.

DETAILED DESCRIPTION OF THE INVENTION

Figure 1:
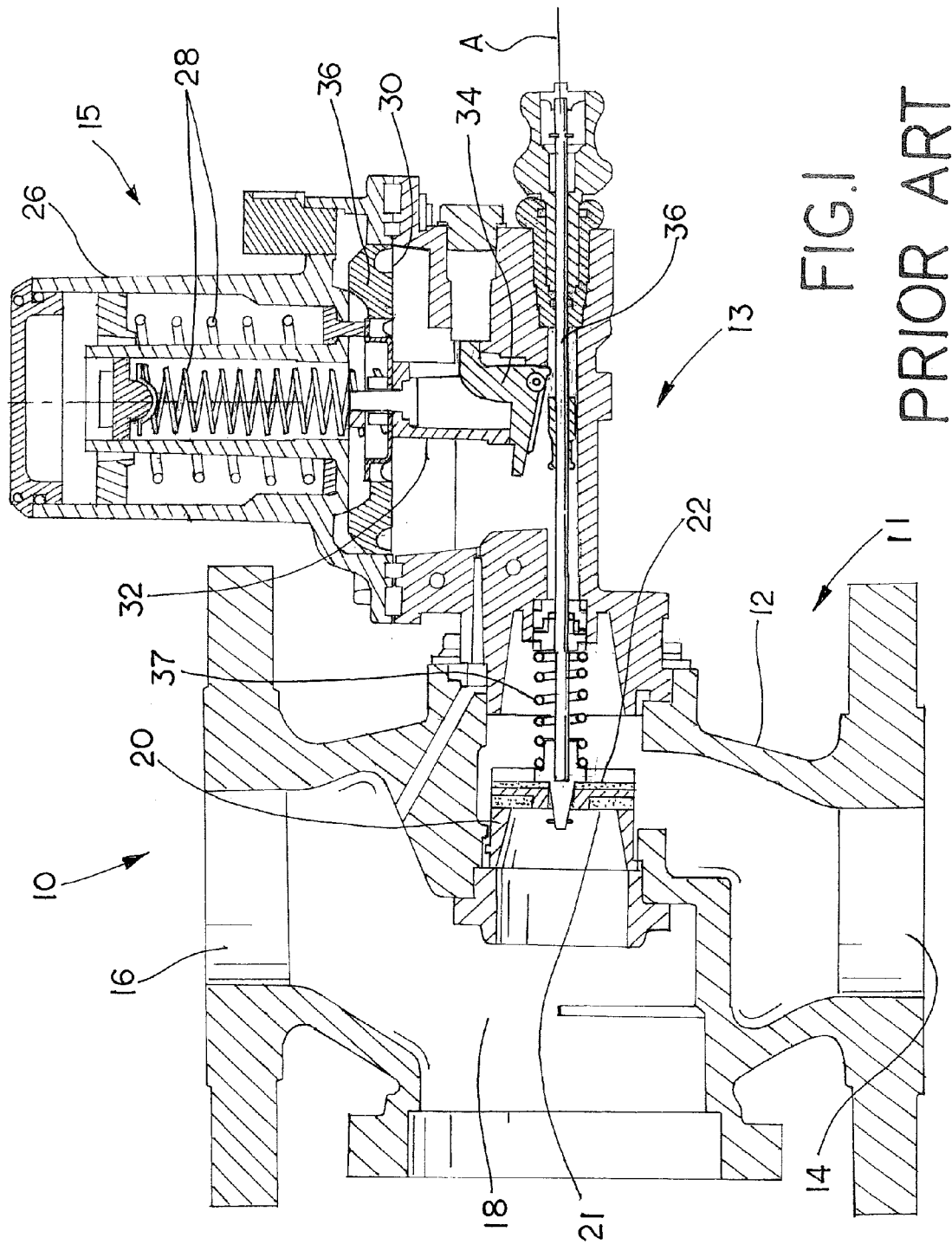
FIG. 1 is a cross-sectional view of a conventional slam shut safety module having a valve disc mounted to the disc support in a conventional manner and showing the valve disc in the closed position.
Figure 2:
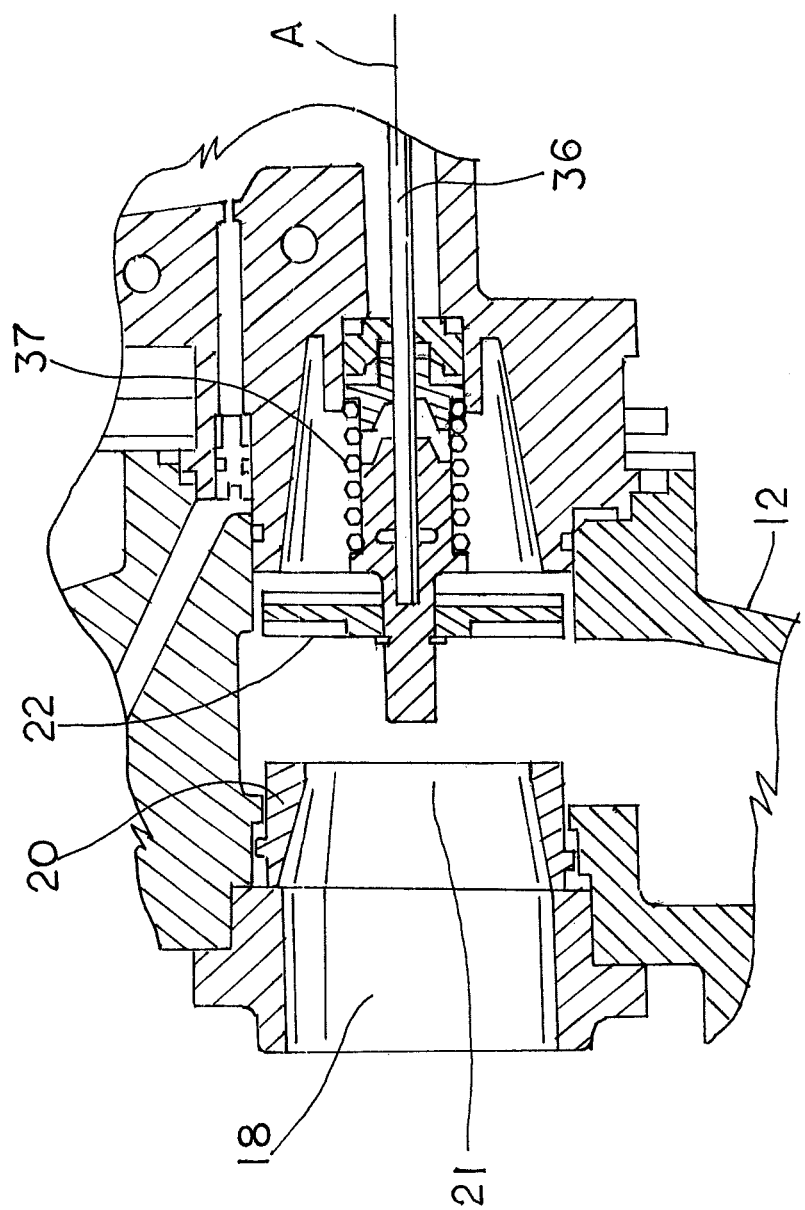
FIG. 2 is an enlarged cutaway view of the slam-shut safety valve of FIG. 1, but showing the valve disc in an open position.

Turning now to the drawings, FIGS. 1 and 2 illustrate one example of a known slam-shut safety device 10. The slam-shut safety device 10 may be attached to a main regulator (not shown) in a gas distribution system to provide a safety shutoff capability in the event of main regulator failure. The slam-shut safety device 10 includes a valve portion 11, a slam-shut portion 13, and an actuator 15. The valve portion 11 includes a valve body 12 having a fluid inlet 14, and a fluid outlet 16 connected by a fluid passage forming a flow path 18. A valve seat 20 is disposed within the valve body 12 and defines a flow orifice 21 forming a portion of the flow path 18. Consequently, fluid flowing through the slam-shut safety device 10 flows from the fluid inlet 14, through the flow path 18 including the valve seat 20 (and the flow orifice 21 formed by the valve seat 20) to the fluid outlet 16.

The slam-shut portion 13 includes a valve disc 22 that cooperates with the valve seat 20 to restrict fluid flow through the valve body 12 when an overpressure or underpressure condition is sensed downstream of the main regulator. The valve disc 22 slides within the valve body 12 toward the valve seat 20 in order to close the fluid orifice 21, and away from the valve seat 20 in order to open the fluid orifice 21. Typically, the actuator 15 includes a housing 26 enclosing one or more springs 28, and the springs 28 are typically connected to a diaphragm 30. The diaphragm 30 is sensitive to pressure changes within the actuator 15 and moves within the actuator housing 26 in response to pressure changes. The diaphragm 30 is connected to a back plate 32, which moves longitudinally within the housing 26 in conjunction with the diaphragm 30. The back plate 32 interacts with a cam 34 to engage or release a reset pin 36. The reset pin 36 is shiftable along a slam-shut axis A relative to the valve body 12 between a retracted or untripped position in which the valve disc 22 is spaced away from the valve seat 20 in an open position opening the flow orifice 21, and an extended or tripped position in which the valve disc 22 is seated against the valve seat 20 in a closed position closing the flow orifice 21.

The slam-shut portion includes a spring 37 or other suitable biasing mechanism, which acts to bias the valve disc 22 toward the closed position. Consequently, the reset pin 36 is shiftable between the untripped position and the tripped position when the actuator 15 senses either an overpressure condition or an underpressure condition. The actuator 15 causes the cam 34 to release the reset pin 36, such that the spring 37 causes the reset pin 36 and hence the valve disc 22 to slide toward the valve seat 20, ultimately bringing the valve disc 22 into contact with the valve seat 20, thus closing the flow orifice 21 and shutting off fluid flow through the flow path 18 in the valve body 12.

FIG. 2 illustrates a close up view of the slam-shut portion 13 of the slam-shut safety device 10. The reset pin 36 is shown connected to the valve disc 22, with the reset pin 36 disposed in the untripped position placing the valve disc 22 in the open position spaced away from the valve seat 20. The reset pin 36, when positioned in the untripped position, may be held in place by the cam 34 or other suitable latching mechanism, such that the cam 34 releasably holds the reset pin 36 in the untripped position (which can also be referred to as the armed position) with the valve disc 22 is spaced away from the valve seat 20. When the cam 34 is activated by the actuator 15, the cam 34 releases the reset pin 36, and the valve disc 22 slides or otherwise shifts toward the valve seat 20 to close the slam-shut safety device 10, preventing fluid flow through the flow path 18 of the valve body 12.

Figure 3:
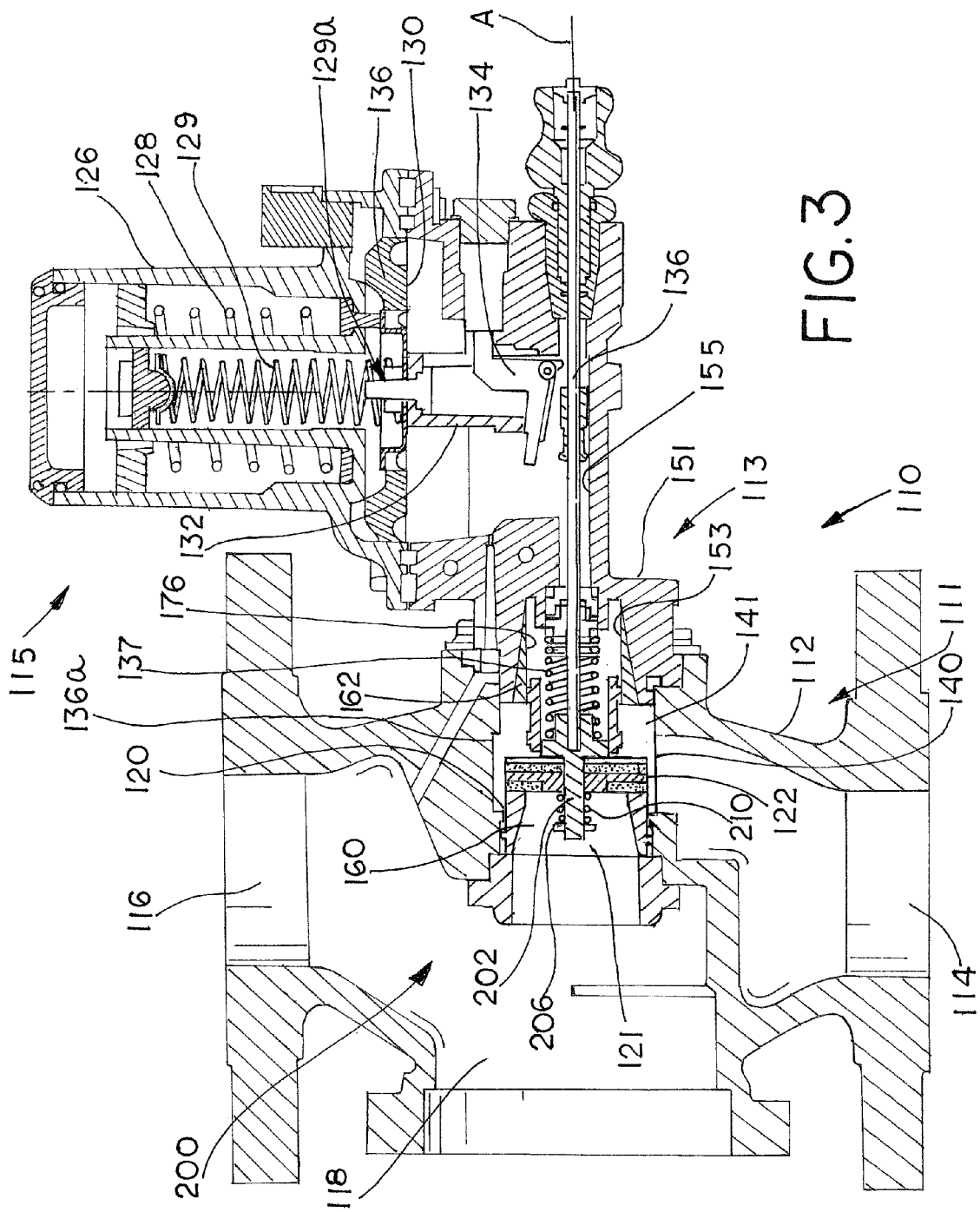
FIG. 3 is a cross-sectional side view of a slam-shut safety valve constructed in accordance with the teachings of the present disclosure and incorporating an arrestor spring operatively coupling the valve disc to the valve disc support.
Figure 4:
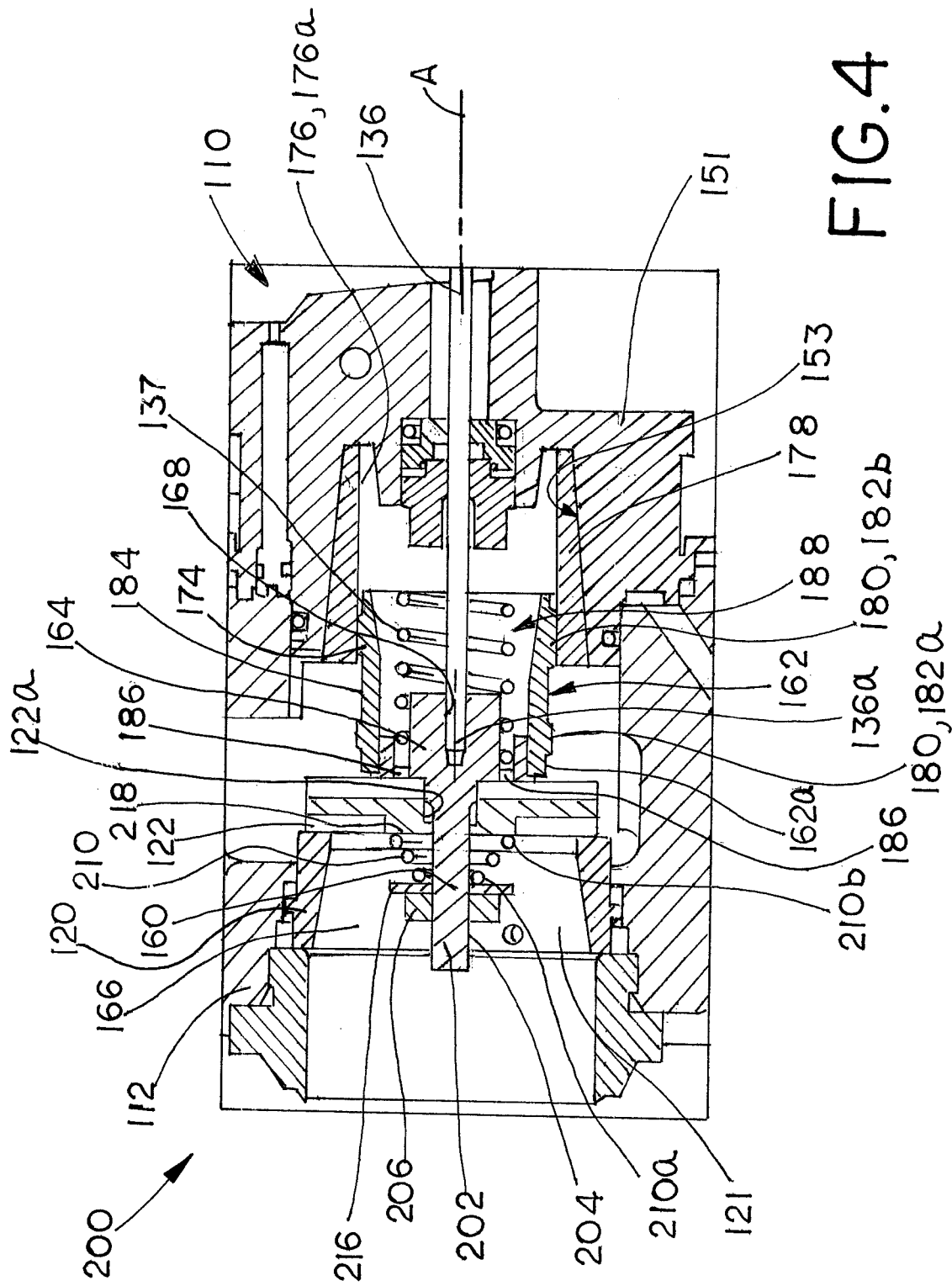
FIG. 4 is an enlarged cutaway view of the slam-shut safety valve of FIG. 3, showing the valve disc in a closed position.
Figure 5:
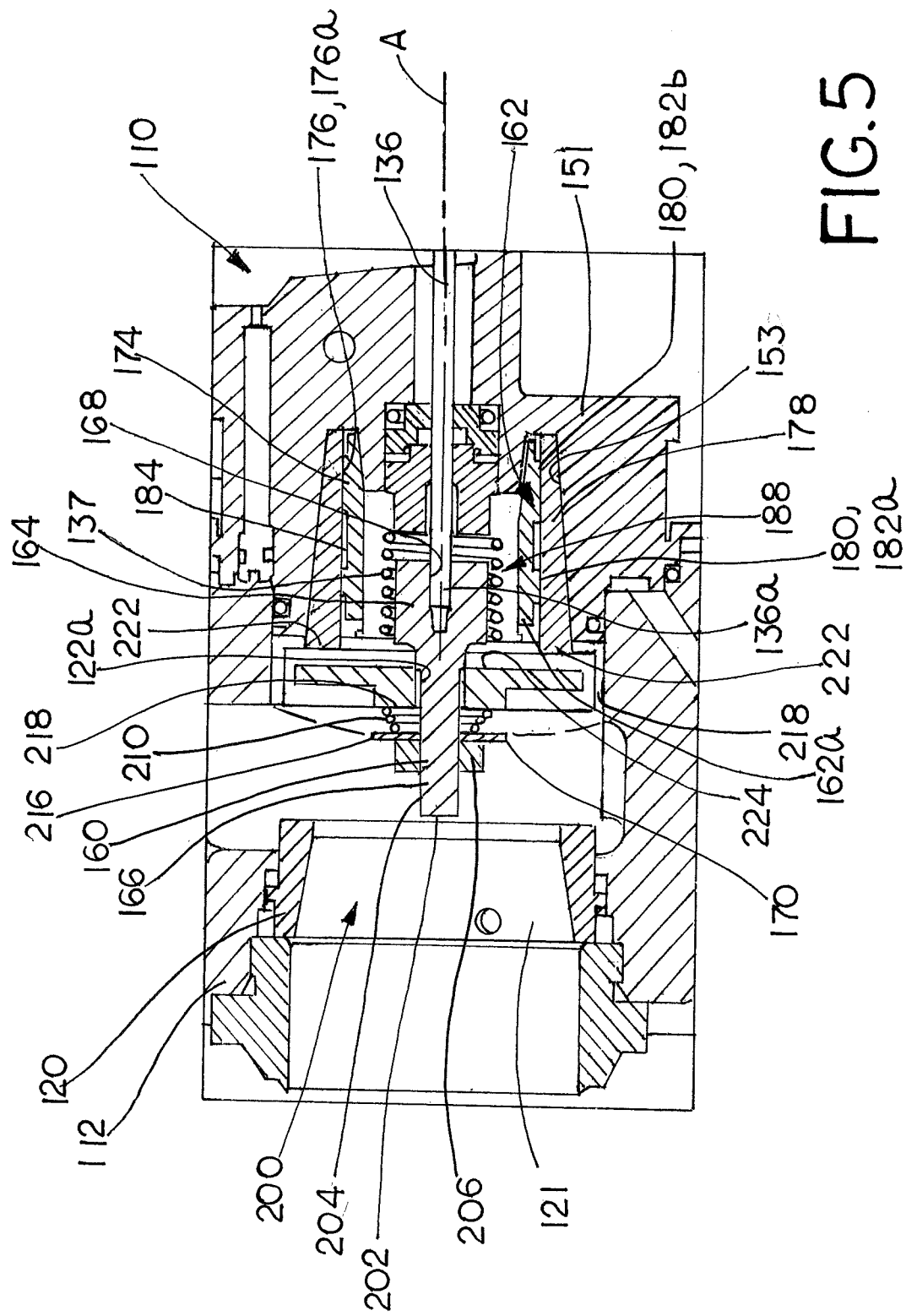
FIG. 5 is an enlarged cutaway view similar to FIG. 4, but showing the valve disc in an open position.

Referring now to FIGS. 3-5, a slam-shut safety device 110 assembled in accordance with the teachings of the present disclosure is shown. The slam-shut safety device 110 may be similar to the slam-shut safety device 10 discussed above with respect to FIGS. 1 and 2, and therefore, the same or similar components will have the same reference numerals, although the reference numerals will be increased by 100. Once again, the slam-shut safety device 110 may be attached to a main regulator (not shown) in a gas distribution system to provide a safety shutoff capability in the event of main regulator failure. As shown in FIG. 3, the slam-shut safety device 110 can include a slam-shut portion 113 and an actuator 115, adapted to be connected to a valve portion 111. The valve portion 111 includes a valve body 112 having a fluid inlet 114 and a fluid outlet 116, with the inlet 114 and the outlet 116 being connected by a fluid passage forming a flow path 118.

As shown in FIGS. 3-5, a valve seat 120 is disposed within the valve body 112 and defines a flow orifice 121 forming a portion of the flow path 118. Consequently, fluid flowing through the valve portion 111 flows from the fluid inlet 114, through the flow path 118 including the valve seat 120 (and the flow orifice 121 formed by the valve seat 120) to the fluid outlet 116.

In the arrangement depicted in FIG. 3, the slam-shut safety device 110 includes an optional cage 140 mounted within a throat portion 141 of the valve body 112. The cage 140 is arranged to receiving a valve disc 122 of the slam-shut portion 113 and may act to surround and/or guide the valve disc 122. In the alternative, the slam-shut safety device 110 may be constructed without the cage 140, similar to the arrangement shown in FIGS. 1 and 2. It will be understood that all of the aspects discussed herein may be constructed in any combination in a slam-shut safety device with or without the optional cage 140.

The slam-shut portion 113 in FIGS. 3-5 includes a slam-shut body 151 and a reset pin 136 slidably disposed in a reset bore 155 of the slam-shut body 151. As shown, the reset pin 136 and reset bore 155 are disposed on a common slam-shut axis A. The slam-shut body 151 further defines a throat portion 153 disposed between the reset bore 155 and the throat portion 141 of the valve body 112. The throat portion 153 of the slam-shut body 151 is connected to the throat portion 141 of the valve body 112. The valve disc 122, which as with the example depicted in FIGS. 1 and 2, cooperates with the valve seat 120 to restrict fluid flow through the slam-shut safety device 110 when an overpressure or underpressure condition is sensed downstream of the main regulator. The valve disc 122 is operably connected to an end 136a of the reset pin 136 such that it shifts along the slam-shut axis A toward the valve seat 120 to a closed position in order to close the fluid orifice 121 in reaction to actuation of the actuator 115, and further shifts along the slam-shut axis A away from the valve seat 120 to an open position in order to open the fluid orifice 121 in reaction to manipulation of the reset pin 136 in a known manner.

Typically, the actuator 115 includes a housing 126 enclosing a set spring 128 and a relief spring 129. The set spring 128 is typically connected to a diaphragm 130 in a conventional manner, while the relief spring 129 is coupled to a relief valve assembly 129a as would be known. The diaphragm 130 is sensitive to pressure changes within the actuator 115 and moves within the actuator housing 126 in response to pressure changes. The diaphragm 130 is connected to a back plate 132, which moves longitudinally (vertically when viewing the drawing) within the housing 126 in conjunction with the diaphragm 130. The back plate 132 interacts with a cam 134 to engage or release a reset pin 136. In turn, the reset pin 136 is shiftable along the slam-shut axis A relative to the valve body 112 between a retracted or untripped position in which the valve disc 122 is spaced away from the valve seat 120 in the open position (FIG. 5) opening the flow orifice 121, and an extended or tripped position in which the valve disc 122 is seated against the valve seat 120 in a closed position (FIGS. 3 and 4) closing the flow orifice 121. The slam-shut portion 113 additionally includes a spring 137 or other suitable biasing mechanism near the end 136a adjacent to the valve disc 122, which acts to bias the valve disc 122 toward the closed position.

Consequently, the reset pin 136, as mentioned, is shiftable along the slam-shut axis A between the untripped position and the tripped position when the actuator 115 senses either an overpressure condition or an underpressure condition. The actuator 115 causes the cam 134 to release the reset pin 136, such that the spring 137 causes the reset pin 136 and hence the valve disc 122 to slide or otherwise shift along the slam-shut axis A toward the valve seat 120, ultimately bringing the valve disc 122 into contact with the valve seat 120, thus closing the flow orifice 121 and shutting off fluid flow through the flow path 118.

Throughout the operation of the device, when the valve disc 122 is in the open position, or another position displaced away from the closed position, fluid flows through the valve body 112 and fluid forces act on the valve disc 122. As discussed above, with respect to FIGS. 1 and 2, in conventional arrangements such fluid forces can be high enough to deform various structures within the device such as, for example, the reset pin 136 or a valve disc support 160 (discussed below), which together help to supports the valve disc 122. These forces also can damage the valve disc itself.

In contrast to the conventional slam-shut safety device 10, however, the slam-shut safety device 110 disclosed with reference to FIGS. 3-5 includes a valve disc arrestor assembly 200. In the example shown, the valve disc arrestor assembly 200 includes a stem 202 carried by the valve disc support 160. One exemplary valve disc support 160 is discussed in greater detail below, although additional forms for the valve disc support 160 may prove suitable for use with the valve disc arrestor assembly 200. The stem 202 of the exemplary valve disc support 160 includes a threaded portion 204 (best visible in FIGS. 4 and 5). As outlined above, the valve disc support 160 is shiftably mounted within the valve body 112 and is operatively coupled to the reset pin 136 in the manner described above, or in any suitable manner. The valve disc support 160 is shiftable relative to the valve body 112 in response to movement of the reset pin 112 between the untripped position and the tripped position. The valve disc 122 includes the central aperture 122a which is sized to allow the valve disc 122 to fit on the stem 202 of the valve disc support 160. The valve disc 122 is shiftable with respect to the valve body 112 generally along the axis A, and moves in response to, in unison with, or in conjunction with movement of the valve disc support 160, allowing the valve disc 122 to shift between an open first position in which the valve disc 122 is spaced away from the valve seat 120 and a closed second position in which the valve disc 122 is seated against the valve seat 120. A suitable securement member 206, such as a threaded nut 208, secures the valve disc 122 to the threaded portion 204 of the stem 202 of the valve disc support 160.

In the example shown, the valve disc arrestor assembly 200 includes an arrestor spring 210 which is positioned on the stem 202 of the valve disc support 160 and is secured by the threaded nut 208 (or any suitable securement member 206). As such, the arrestor spring 210 is positioned to apply a biasing force to the valve disc 122, with the biasing force being to the right when viewing FIGS. 3-5. As best shown in FIGS. 4 and 5, the arrestor spring 210 includes a first end 210a oriented generally toward the securement member 206, and includes a second end 210b oriented toward the valve disc 122.

Figure 9:
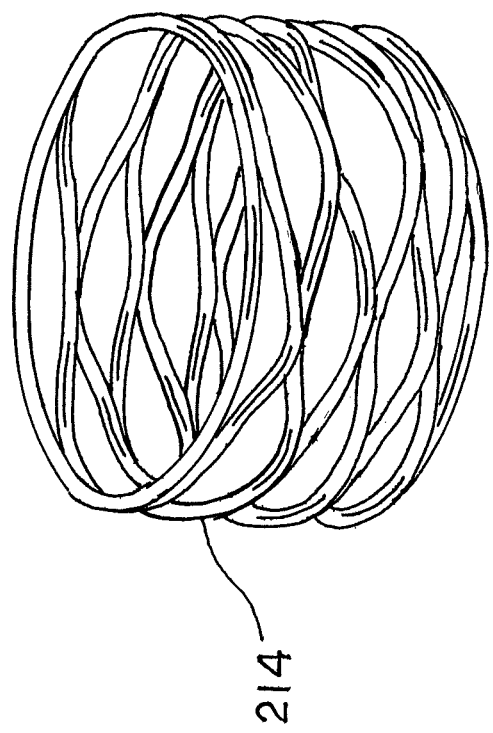
FIG. 9 is an enlarged view of an exemplary wave spring.
Figure 8:
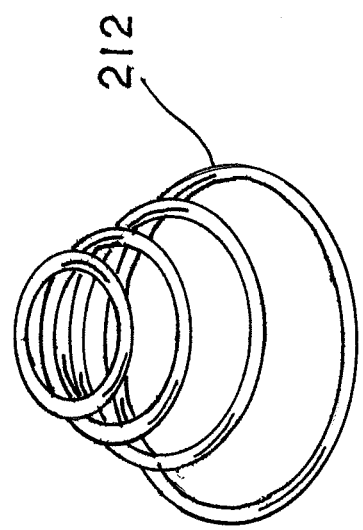
FIG. 8 is an enlarged view of an exemplary conical spring.

Preferably, the arrestor spring 210 is a steel spring, although other materials may prove suitable. The arrestor spring 210 may take the form of a conical coil spring 212 such as is shown in FIGS. 6 and 8. Alternatively, the arrestor spring 210 may take the form of a wave spring 214 such as is shown in FIGS. 7 and 9. The arrestor spring 210 may take still further suitable forms, such as a Belleville washer, a compressible grommet, or any other type of suitable biasing member.

Together, the arrestor spring 210, the adjustable securement member 206 such as the threaded nut 208, the spring seats 216 and 218 which may be drawn together relative to one another as the spring 210 is compressed, form an arrestor mean for the valve disc 122.

As shown in FIGS. 4, 5 and 7, the valve disc arrestor assembly includes a spring seat 216 which may be formed by a washer, and also includes a spring seat 218 which may be formed by a surface of the valve disc 122 or by another intervening washer. The end 210a of the spring 210 bears against the spring seat 216, while the end 210b of the spring 210 bears against the spring seat 218. Because the threaded nut 208 is adjustable, the load on the spring 210 can be adjusted to apply a desired force or pre-load to the valve disc 122.

Referring to FIG. 5, the interior of the valve body 112 includes a recess 220. The recess 220 is positioned inside the valve body to provide an area in which the valve disc 122 can be retracted into when the valve disc is in the open position of FIG. 5. The recess 220 is formed to allow all or at least a portion of the valve disc to be pulled out of the flow path when the valve disc is in the open position shown. Additionally, the interior of the valve body may include one or more optional stops 222. The stops 222 are positioned such that a back surface 224 of the valve disc 122 contacts or otherwise engages the stops 22. Consequently, when the reset pin 136 is pulled to the untripped position of FIG. 5, the spring 210 is compressed between the spring seats 216 and 218, with the spring seat 216 moving closer to the spring seat 218 as the spring 210 compresses, thus applying a biasing force to the valve disc 122 toward the right when viewing FIGS. 4 and 5. As the spring 210 is compressed, a portion of the stem 202 slides through the aperture 122a.

As shown to advantage in FIGS. 6 and 7, the arrestor spring 210, whether in the form of the conical coil spring 212 or the wave spring 214, is positioned to continuously wind around the stem 202. Stated another way, the arrestor spring 210 encircles the stem 202, and/or is generally cylindrical and surrounds or continuously surrounds the stem 202.

Referring again to FIGS. 3-5, the valve disc support 160 is connected to a guide collar 162. Referring again to FIGS. 4 and 5, the plug support 160 of the present version of the slam-shut safety device 110 includes a body portion 164 and a nose portion 166 extending to form the stem 202 and extending away from the body portion 164. The body portion 164 includes a generally cylindrical form defining a blind bore 168 receiving and connected to the end 136a of the reset pin 136. The nose portion 166 also includes a generally cylindrical form, but with a diameter substantially smaller than a diameter of the body portion 164, and, in the present version, a longitudinal dimension substantially longer than a longitudinal dimension of the body portion 164. As shown, the nose portion 166 extends through the central opening or aperture 122a of the valve disc 122. In the disclosed version, the threaded nut 208 is threaded onto the threaded portion 204 of the stem 202 for retaining the valve disc 122 on the valve disc support 160.

As outlined above, the disclosed version includes the spring 210 disposed between the nut 208 and the valve disc 122 to bias the valve disc away from the nut 208. This biasing force also fosters engagement between the back side of the valve disc 122 and the body portion 164 of the plug support 160. As mentioned, the spring 210 biases the valve disc 122 against the body portion 164 of the plug support 160. This biasing force advantageously serves to minimize or prevent any suction created by fluid flowing through the valve body 112 when the valve disc 122 is in the open position, and prevents or minimizes any displacement of the valve disc 122 away from the body portion 164 and into the flow path, which can reduce the overall flow area of the flow path. Additionally, in accordance with the disclosed example, the spring 210 provides sufficient flexibility that the valve disc 122 can float on the nose portion 166 of the plug support 160 to enable the valve disc 122 to properly align itself against the valve seat 120, when in the closed position.

As best shown in FIGS. 4 and 5, the guide collar 162 of the presently disclosed version of the slam-shut safety device 110 is connected to the plug support 160 and includes a hollow cylindrical portion 174 extending at least partly over the reset pin 136. More specifically, in the present version, a first end 162*a* of the guide collar 162 is threadably connected to the body portion 164 of the plug support 160. In other versions, instead of a threaded connection the guide collar 162 can be connected to the plug support 164 by a weld joint, a friction fit joint, a pinned joint, an adhesive joint, a fastener connection, or any other suitable means. While the guide collar 162 and plug support 160 thus far has been described as separate component connected together, in other versions, the guide collar 162 and the plug support 160 could be integrally formed as one-piece.

With continued reference to FIGS. 4 and 5, the guide collar 162 is slidably disposed in the throat portion 153 of the slam shut body 151. More specifically, the slam-shut safety device 110 defines a guide bore 176, in which the guide collar 162 is slidably disposed. In the version of the slam-shut body 151 depicted in FIGS. 3-5, the guide bore 176 is carried by a sleeve insert 178 fixed in the throat portion 153 of the slam-shut body 151 because the guide bore 176 must be cylindrical in form, while the existing throat portion 153 defines a tapered conical opening. In other versions, however, the slam shut body 151 can be formed or machined, for example, such that the guide bore 176 is formed directly in the slam shut body 151. In such a version, no sleeve insert 178 is required.

With the slam-shut safety device 110 constructed as described above, it can be seen that the guide collar 162 is shiftable along the slam-shut axis A in generally the same manner that the valve disc 122 and reset pin 136 are. That is, the guide collar 162 is shiftable along the slam-shut axis A between a retracted position, as shown in FIG. 5, wherein the valve disc 122 is in the open position, and an extended position, as shown in FIG. 4, when the valve disc 122 is in the closed position. In the retracted position, a majority of the guide collar 162 is disposed inside of the guide bore 176. In this position, any fluid forces generated in the valve body 112 and acting on the valve disc 122 are transferred to the guide collar 162 via the plug support 160, and ultimately borne by the throat portion 153 of the slam-shut body 151. Similarly, when displaced away from the retracted position toward the extended position, any fluid forces present in the valve body 112, for example prior to the valve disc 122 reaching the closed position, are transferred to the guide collar 162 via the plug support 160, and ultimately borne by the throat portion 153 of the slam-shut body 151. Thus, it can be appreciated that the guide collar 162 in combination with the other disclosed features effectively transfers fluid forces away from the reset pin 136, thereby maximizing the strength, integrity, and useful life of the slam-shut safety device 110.

To assist with facilitating displacement of the guide collar 162 relative to the guide bore 176, the version of the guide collar 162 depicted in FIGS. 3-5 can further include a plurality of guide ribs 180 disposed between the guide collar 162 and an inner wall 176*a* of the guide bore 176 to reduce the shear friction that might otherwise exist between these surfaces. In the version in FIGS. 3-5, the plurality of guide ribs 180 include first and second circumferential guide ribs 182*a*, 182*b* carried by an outer surface 184 of the guide collar 162 and centered on the slam-shut axis A. Moreover, the circumferential guide ribs 182*a*, 182*b* are spaced axially along the guide collar 162. So configured, the first circumferential guide rib 182*a* is positioned near the first end 162*a* of the guide collar 162 and the second circumferential rib 182*b* is positioned near a second end 162*b* of the guide collar 162. In this manner, both the first and second circumferential ribs 182*a*, 182*b* reside in contact with the inner wall 176*a* of the guide bore 176 when the valve disc 122 is in the open position and the guide collar 162 is in the retracted position, as shown in FIG. 5. Accordingly, when in the retracted position, each of the first and second circumferential ribs 182*a*, 182*b* lend to transferring fluid forces acting on the valve disc 122 to the throat portion 153 of the slam-shut body 151. In contrast, when the valve disc 122 is the closed position and the guide collar 162 is in the extended position, as shown in FIGS. 3 and 4, the first circumferential rib 182*a* is disposed outside of the guide bore 176 toward the valve seat 120, while the second circumferential rib 182*b* remains in contact with the inner surface 176*a* of the guide bore 176. Accordingly, when in the extended position, only the second circumferential rib 182*b* lends to transferring fluid forces acting on the valve disc 122 to the throat portion 153 of the slam-shut body 151.

In addition to the plurality of guide ribs 180, the present version of the slam-shut safety device 110 further includes one or more openings 186 in the plug support 160. The one or more openings 186 provide fluid communication between the flow path in the valve body 112 and an interior chamber 188 of the guide collar 162. So configured, the one or more openings 186 facilitate the movement of the guide collar 162 between the retracted and extended positions by allowing fluid to freely pass between the interior chamber 188 and the flow path. For example, when moving from the extended position (FIG. 4) to the retracted position (FIG. 5), fluid collected in the interior chamber 188 is exhausted out of the one or more openings 186. In contrast, when moving from the retracted position (FIG. 5) to the extended position (FIG. 4), fluid passes through the one or more openings 186 to fill the interior chamber 188.

As mentioned above, an alternative version of the slam-shut safety device 110 of FIGS. 3-5 can include the plug support 160 and the guide collar 162 constructed as one-piece. One example of such an alternative version is depicted in FIG. 6. For the sake of description only, the alternative version of the slam-shut safety device 110 depicted in FIG. 6 also includes an alternative arrangement of the plurality of guide ribs 180 disposed between the guide collar 162 and the inner wall 176*a* of the guide bore 176.

When assembled in accordance with the teachings outlined herein, the slam-shut safety device 110 replaces conventional arrangements, in which the valve disc is secured with a fastening clip, with a more robust arrangement which applies a suitable spring force to the valve disc. The more robust spring force obtainable using the valve disc arrestor assembly 200 discussed above places a securing force against the valve disc and may further placed the valve disc in a protected recess outside of the flow path. Consequently, when assembled as discussed in accordance with the teachings outlined herein, the resulting slam-shut safety device 110 may experience greater accuracy compared to more conventional arrangements, due to the fact that conventional fluid flow forces are reduced on one or more of the valve disc, the disc support, the reset pin, and/or other components. Further, by removing the valve disc from the flow path, the valve disc is protected from the dynamic forces that impact the valve disc in the more conventional arrangements. By reducing forces on the valve disc and on other internal components, the resulting slam-shut safety device 110 experiences reduced wear on the valve disc and other internal components, resulting in a longer service life.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A slam-shut safety device having a disc arrestor, the slam-shut safety device comprising:
   a valve body, the valve body having an inlet, an outlet, and defining a flow path extending between the inlet and the outlet, the valve body including a valve seat surrounding an orifice disposed between the inlet and the outlet;
   a reset pin mounted within the valve body and arranged to respond to an actuator, the reset pin shiftable relative to the valve body along an axis between an untripped position and a tripped position;
   a valve disc support, the valve disc support including a stem having a threaded portion, the valve disc support mounted within the valve body and operatively coupled to the reset pin, the valve disc support shiftable relative to the valve body in response to movement of the reset pin between the untripped position and the tripped position;
   a valve disc, the valve disc including a central aperture sized to fit on the stem of the valve disc support, the valve disc shiftably disposed within the valve body and movable in response to movement of the valve disc support between an open first position in which the valve disc is spaced away from the valve seat and a closed second position in which the valve disc is seated against the valve seat;
   a threaded nut securable to the threaded portion of the stem of the valve disc support;
   an arrestor spring positioned on the stem of the valve disc support and secured by the threaded nut, the arrestor spring arranged to apply a biasing force to valve disc.

2. The slam-shut safety device of claim 1, wherein the arrestor spring is a steel spring, and further wherein the arrestor spring is a wave spring or a coil spring.

3. The slam-shut safety device of claim 1, including a washer disposed between the threaded nut and the arrestor spring, and wherein the threaded nut is adjustable along the stem of the valve disc support to allow adjustment of a spring force applied by the arrestor spring to the valve disc.

4. The slam-shut safety device of claim 3, wherein the valve body includes a recess, the recess sized to receive at least a portion of the valve disc when the valve disc is in the open first position, the recess further sized to allow placement of the portion of the valve disc out of the flow path.

5. The slam-shut safety device of claim 3, wherein the valve disc support is slidably mounted within a guide collar disposed within the valve body.

6. The slam-shut safety device of claim 5, wherein the guide collar includes a hollow cylindrical portion extending at least partly over the reset pin at a location adjacent to the valve disc, the guide collar slidably supported by a guide bore defined within the valve body.

7. The slam-shut safety device of claim 6, wherein the guide collar is shiftable along the axis between a retracted position, wherein a majority of the guide collar is disposed inside of the guide bore when the reset pin is in the untripped position, and an extended position, wherein at least a portion of the guide collar is disposed outside of the guide bore when the reset pin is in the tripped position.

8. A slam-shut safety device having a disc arrestor, the slam-shut safety device comprising:
   a valve body, the valve body having an inlet, an outlet, and defining a flow path extending between the inlet and the outlet, the valve body including a valve seat surrounding an orifice disposed between the inlet and the outlet;
   a reset pin mounted within the valve body and arranged to respond to an actuator, the reset pin shiftable relative to the valve body along an axis between an untripped position and a tripped position;
   a valve disc support, the valve disc support mounted within the valve body and operatively coupled to the reset pin, the valve disc support shiftable relative to the valve body in response to movement of the reset pin between the untripped position and the tripped position;
   a valve disc, the valve disc shiftably disposed within the valve body and movable axially along the axis of the reset pin in response to movement of the valve disc support between an open first position in which the valve disc is spaced away from the valve seat and a closed second position in which the valve disc is seated against the valve seat;
   a valve disc arrestor assembly, the valve disc arrestor assembly including an arrestor spring operatively coupling the valve disc to the valve disc support and an adjustable connection securing the valve disc to the valve disc support, the arrestor assembly arranged to apply a biasing force to valve disc in a direction parallel to the axis.

9. The slam-shut safety device of claim 8, wherein the valve disc support includes a stem and wherein the arrestor spring is a steel spring positioned to continuously wind around the stem.

10. The slam-shut safety device of claim 8, wherein the valve disc support includes a stem and wherein the arrestor spring encircles the stem, and further wherein the arrestor spring is a wave spring or a coil spring.

11. The slam-shut safety device of claim 8, wherein the valve disc support includes a stem and wherein the arrestor spring is generally cylindrical and surrounds the stem.

12. The slam-shut safety device of claim 9 wherein the adjustable connection comprises a threaded nut and a threaded stem carried by the valve disc support, and wherein the threaded nut is adjustable along the stem to allow adjustment of a spring force applied by the arrestor spring to the valve disc.

13. The slam-shut safety device of claim 12, wherein the valve body includes a stop, and wherein the valve disc is arranged to contact the stop when the reset pin is moved to the untripped position, and wherein the arrestor spring biases the valve disc toward the stop when the valve disc is in the open first position.

14. The slam-shut safety device of claim 13, wherein the valve body includes a recess sized to receive at least a portion of the valve disc when the valve disc is in the open first position, wherein the valve disc engages the stop when the valve disc is disposed in the recess.

15. A slam-shut safety device, comprising:
   a valve body, the valve body having an inlet, an outlet, and defining a flow path extending between the inlet and the outlet, the valve body including a valve seat surrounding an orifice disposed between the inlet and the outlet;
   a valve disc, the valve disc disposed within the valve body and shiftable along a slam-shut axis between an open first position in which the valve disc is spaced away from the valve seat, and a closed second position in which the valve disc is seated against the valve seat;

a reset pin operatively shiftable along an axis relative to the valve body between an untripped position and a tripped position, the reset pin arranged to respond to an actuator to shift the reset pin from the untripped position toward the tripped position, wherein the valve disc is axially shiftable along the axis of the reset pin;

a valve disc support operatively coupled to the reset pin and shiftable in unison with the reset pin; and arrestor means operatively coupling the valve disc to the valve disc support, the arrestor means arranged to reduce a transfer of fluid forces from the valve disc to the reset pin.

16. A method of arresting movement of a valve disc in a slam-shut safety device, comprising:

providing a valve body having an inlet, an outlet, and defining a flow path extending between the inlet and the outlet, the valve body including a valve seat surrounding an orifice disposed between the inlet and the outlet;

providing a valve disc within the valve body and shiftable along a slam-shut axis between an open first position in which the valve disc is spaced away from the valve seat, and a closed second position in which the valve disc is seated against the valve seat;

providing a reset pin operatively shiftable along an axis relative to the valve body between an untripped position and a tripped position, and arranging the reset pin to respond to an actuator to shift the reset pin from the untripped position toward the tripped position;

providing a valve disc support operatively coupled to the reset pin and shiftable in unison with the reset pin;

providing an arrestor spring operatively coupling the valve disc to the valve disc support, the arrestor spring arranged to reduce a transfer of fluid forces from the valve disc to the reset pin;

providing a stop, the valve disc arranged to engage the stop when the valve disc is in the open first position; and arranging the arrestor spring to apply a biasing force to the valve disc against the stop when the valve disc is in the open first position.

17. The method of claim 16, including providing a recess, and sizing the recess to receive at least a portion of the valve disc when the valve disc is in the open first position.

* * * * *

UNITED STATES PATENT AND TRADEMARK OFFICE
CERTIFICATE OF CORRECTION

| | | |
|---|---|---|
| PATENT NO. | : 9,086,158 B2 | Page 1 of 1 |
| APPLICATION NO. | : 14/038453 | |
| DATED | : July 21, 2015 | |
| INVENTOR(S) | : Jeffrey M. Sanders et al. | |

It is certified that error appears in the above-identified patent and that said Letters Patent is hereby corrected as shown below:

On the Title Page:

At item (73), line 3, "MANGEMENT REGULATOR TECHNOLOGIES INC., McKinney," should be -- MANAGEMENT REGULATOR TECHNOLOGIES, INC., McKinney, --.

At item (57), line 4, "includes has" should be -- includes --.

In the Specification:

At Column 7, line 32, "reset pin 112" should be -- reset pin 136 --.

At Column 8, line 24, "stops 22." should be -- stops 222. --.

Signed and Sealed this
Twenty-sixth Day of April, 2016

Michelle K. Lee
*Director of the United States Patent and Trademark Office*